US006757363B1

(12) United States Patent
Platt et al.

(10) Patent No.: US 6,757,363 B1
(45) Date of Patent: Jun. 29, 2004

(54) METHOD AND APPARATUS FOR OPERATING A TELEPHONE AS AN INDEPENDENT NETWORK CLIENT

(75) Inventors: Richard B. Platt, Allen, TX (US); Mark R. Nelson, Plano, TX (US); Paul S. Hahn, Plano, TX (US); Richard A. Dunlap, Euless, TX (US); Jeffery A. Sanders, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 456 days.

(21) Appl. No.: 09/584,933

(22) Filed: May 31, 2000

(51) Int. Cl.⁷ ............................................. H04M 3/42
(52) U.S. Cl. ............................ 379/88.11; 379/88.17; 379/93.17
(58) Field of Search ........................ 379/67.1, 88.11, 379/88.12, 88.13, 88.14, 88.17, 90.01, 93.17, 265.09, 900, 916; 709/203, 217, 218, 227, 321, 328; 370/352, 355, 358

(56) References Cited

U.S. PATENT DOCUMENTS

| | | | |
|---|---|---|---|
| 4,313,036 A | | 1/1982 | Jabara et al. |
| 4,903,261 A | | 2/1990 | Baran et al. |
| 4,905,231 A | | 2/1990 | Leung et al. |
| 5,093,827 A | | 3/1992 | Franklin et al. |
| 5,195,086 A | | 3/1993 | Baumgartner et al. |
| 5,235,595 A | | 8/1993 | O'Dowd |
| 5,327,529 A | | 7/1994 | Fults et al. |
| 5,473,680 A | | 12/1995 | Porter |
| 5,513,126 A | * | 4/1996 | Harkins et al. ............. 709/228 |
| 5,526,353 A | | 6/1996 | Henley et al. |
| 5,550,906 A | | 8/1996 | Chau et al. |
| 5,594,732 A | | 1/1997 | Bell et al. |
| 5,610,910 A | * | 3/1997 | Focsaneanu et al. ........ 370/351 |
| 5,659,542 A | | 8/1997 | Bell et al. |
| 5,689,550 A | * | 11/1997 | Garson et al. ........... 379/88.18 |
| 5,742,596 A | | 4/1998 | Baratz et al. |
| 5,862,134 A | * | 1/1999 | Deng ......................... 370/352 |
| 5,937,057 A | | 8/1999 | Bell et al. |
| 6,404,746 B1 | * | 6/2002 | Cave et al. ................. 370/262 |
| 6,411,615 B1 | * | 6/2002 | DeGolia et al. ............ 370/352 |
| 6,434,528 B1 | * | 8/2002 | Sanders ...................... 704/275 |
| 6,445,682 B1 | * | 9/2002 | Weitz ......................... 370/257 |
| 6,445,694 B1 | * | 9/2002 | Swartz ........................ 370/352 |
| 6,449,269 B1 | * | 9/2002 | Edholm ...................... 370/352 |
| 6,510,152 B1 | * | 1/2003 | Gerszberg et al. .......... 370/352 |
| 6,522,647 B1 | * | 2/2003 | Czajkowski et al. ........ 370/356 |
| 2001/0040885 A1 | * | 11/2001 | Jonas et al. ................. 370/352 |
| 2001/0043591 A1 | * | 11/2001 | Nance et al. ............... 370/352 |
| 2001/0046237 A1 | * | 11/2001 | Chan et al. ................. 370/419 |
| 2002/0057671 A1 | * | 5/2002 | Kikinis ....................... 370/352 |
| 2002/0181670 A1 | * | 12/2002 | Myers et al. ............. 379/88.13 |

FOREIGN PATENT DOCUMENTS

WO     WO 93/16545     8/1993

OTHER PUBLICATIONS

Multimedia Convferencing in the Etherphone Environment, Harrick M. Vin et al., Oct. 1991 IEEE pp. 69–79.*

"System Description for the Cisco Communications Network, Version 2.1", Cisco Systems, Inc., two cover pages, and pp. iii–v and 1–36, Jan., 1999.

Marketing Material for "iPhone", InfoGear Technology Corporation, 11 sheets.

Marketing Material for "Cisco IP Phone Model 30 VIP", Cisco Technology, 3 sheets.

\* cited by examiner

*Primary Examiner*—Scott L. Weaver
(74) *Attorney, Agent, or Firm*—Baker Botts L.L.P.

(57) ABSTRACT

A system (10) includes a packet-switched network (12). A plurality of telephones (21–26) are each coupled to the network. A call manager server (31) is also coupled to the network, in order to interact with the telephones to implement telephony functions. Each of the telephones has the capability to act as an independent network client, by using Internet-compatible protocols to communicate directly with a resource server, without the participation or even the awareness of the call manager server. The resource server may be a local server (32) coupled directly to the network, or a remote server (66–68) coupled to the network through some other network, such as the Internet (52).

5 Claims, 7 Drawing Sheets

METHOD AND APPARATUS FOR OPERATING A TELEPHONE AS AN INDEPENDENT NETWORK CLIENT

TECHNICAL FIELD OF THE INVENTION

This invention relates in general to a telephone system and, more particularly, to a telephone system in which communication with the telephone is effected through a packet-switched network.

BACKGROUND OF THE INVENTION

In a facility or situation where several telephones are required, the traditional approach was to install wiring which served as dedicated telephone wiring. In recent years, however, as the use of computers has expanded, the need for communication between computers has caused organizations to add an additional level of wiring, which is a network to interconnect the computers.

It has been previously recognized that it can be advantageous and cost-effective to use a single network of wiring to effect both telephone services and communication between computers. To this end, telephones have previously been developed which can be coupled to a traditional computer-type network, such as a network conforming to the industry standard commonly known as Ethernet. While these existing network-based telephone systems have been generally adequate for their intended purposes, they have not been satisfactory in all respects.

More specifically, each of the telephone units in an existing system usually has only a moderate amount of intelligence, and is limited in its functional capability by the fact that it basically operates under the control of a central control unit commonly referred to as a call manager server. As a result, the typical telephone is only as powerful as the call manager server to which it is a slave. It is difficult or impossible for third-party vendors to provide new features for such a telephone. In fact, even the manufacturer of the telephone system would typically need to develop and deploy a software upgrade to the call manager server in order to add new functionality, and such an upgrade might be cost-prohibitive if its utility was limited to a particular system, or to a particular type of system.

These limitations are ironic in view of the fact that an extensive volume of information is typically available through the packet-switched network utilized by the telephone system. For example, many such networks are coupled to the Internet, and thus have access to the wealth of information which is in the subset of the Internet commonly known as the World Wide Web (WWW). Computers which use the network have ready access to most or all of the resources of the WWW. However, because existing telephone units for packet-switched networks are basically designed to communicate only with each other and with a call manager server, and are designed to carry out this communication through use of a dedicated protocol, they have no capability to access resources which may be available through the network but which cannot be accessed with the dedicated protocol. Stated differently, existing telephone units are not capable of using a public network communication protocol which will permit them to act as an independent network client with respect to available network resources that are not part of the specific telephone system itself.

SUMMARY OF THE INVENTION

From the foregoing, it may be appreciated that a need has arisen for a method and apparatus which provide telephone units of a network-based telephone system with the capability to independently access network resources outside the telephone system itself. According to the present invention, a method and apparatus are provided to address this need, and involve operating a control unit of a telephone unit so as to selectively cause the telephone unit to facilitate a telephony function by transmitting and receiving, through a network interface, message units of a first type which are in a digital format, and operating the control unit to selectively cause the telephone unit to function as an independent network client capable of communicating directly with a server by transmitting and receiving, through the network interface, message units of a second type which are in a digital format and which conform to a public network communication protocol.

BRIEF DESCRIPTION OF THE DRAWINGS

A better understanding of the present invention will be realized from the detailed description which follows, taken in conjunction with the accompanying drawings, in which.

DETAILED DESCRIPTION OF THE INVENTION

Figure 1:
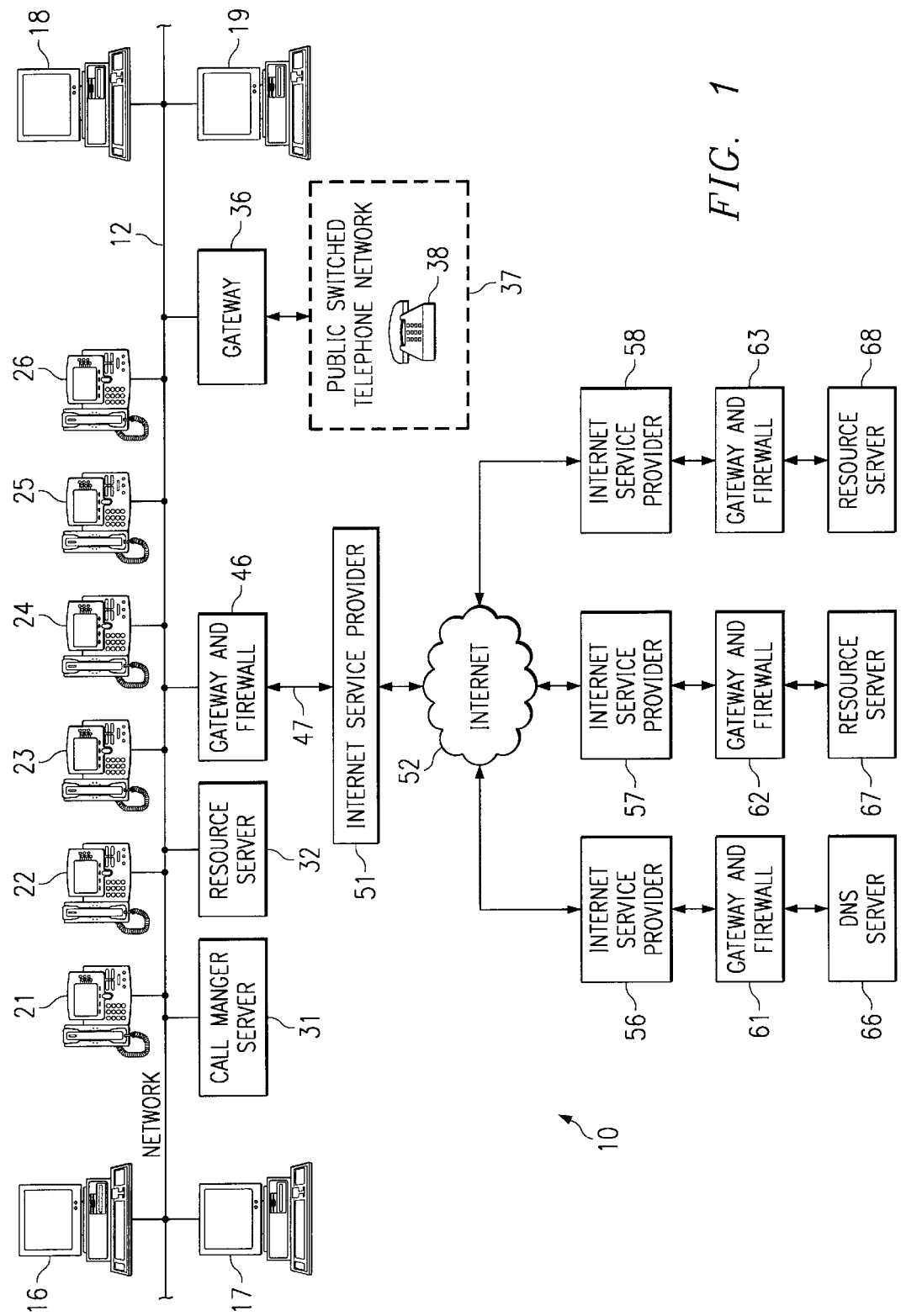
FIG. 1 is a block diagram of a system which embodies the present invention, including a packet-switched network, and including several computers and telephones which are coupled to and communicate through the network.

FIG. 1 is a diagrammatic view of a system 10 which embodies the present invention. The system 10 includes a network 12, which is of a known type commonly used to transfer digital information between computers. Information is sent through the network in the form of packets or message units, which each include digital data and control information. In the disclosed embodiment, the network 12 is a local area network (LAN) which conforms to a standard known in the industry as the Ethernet standard. However, other types of networks could alternatively be used.

The system 10 includes several personal computers, four of which are shown at 16–19. Each of the computers 16–19 is coupled to the network 12, and the computers 16–19 can send and receive information through the network 12. The computers 16–19 could be omitted for purposes of the present invention. However, the computers 16–19 are included in FIG. 1 in order to emphasize that the network 12, in addition to use for implementation of a telephone system, can be concurrently used for other functions which may be separate and independent, such as the transmission of information between computers.

The system 10 further includes a plurality of telephones, six of which are shown at 21–26. Each of the telephones 21–26 is operationally coupled to the packet-switched network 12, rather than to a traditional dedicated telephone line of an analog or proprietary digital type. In the disclosed embodiment, the telephones 21–26 are all structurally identical.

The system 10 also includes a call manager server 31 and a resource server 32, each of which is operatively coupled to the network 12. The hardware for each of the servers 31 and 32 can be any of a number of different server units which are commercially available and known to those skilled in the art. In FIG. 1, for purposes of facilitating an understanding of the present invention the servers 31 and 32 are shown as physically separate units, in order to make it clear that these servers implement respective different functions which are separate and independent from each other. However, it would alternatively be possible to implement all of the functionally of both of these servers within a single physical server unit. The functions implemented by the servers 31 and 32 are discussed later.

The system 10 also includes a gateway 36, which is coupled to the network 12, and which is also coupled to a conventional public switching telephone network (PSTN) 37. The PSTN 37 is shown diagrammatically in FIG. 1, and includes many telephones, one of which is shown at 38. The gateway 36 is a commercially available component, and therefore not discussed in detail here.

The system 10 also includes a gateway and firewall 46, which is operatively coupled to the network 12, and which is coupled through a communication link 47 to an Internet service provider (ISP) 51. The communication link 47 may be any of a number of different types of communication links, such as a T1 line, a microwave link, a cable modem link, or a dedicated telephone line. The ISP 51 provides access to the Internet, which is shown diagrammatically in FIG. 1 at 52. The firewall implemented at 46 is of a known type, and limits the extent to which a person using the Internet 52 can obtain access to the network 12 and the various devices which are coupled to the network 12. Communications which conform to selected Internet standards, such hypertext transport protocol (HTTP) or file transfer protocol (FTP), will typically be permitted to pass through a firewall of the type indicated at 46. On the other hand, there are other types of Internet communications which the firewall at 46 will block from access to the network 12.

It will be recognized that, in addition to the network 12, the Internet 52 is operatively coupled to a large number of computers located throughout the world. For purposes of facilitating an understanding of the present invention, FIG. 1 depicts only a small subset of these computers. In particular, FIG. 1 shows three ISPs 56–58, which are each coupled to the Internet 52, and which are each coupled through a respective gateway and firewall unit 61–63 to a respective server 66–68. The server 66 is a Domain Name System (DNS) server, which will translate a domain name such as www.abcd.com into an Internet protocol (IP) address. The servers 67 and 68 are resource servers which, for purposes of the present invention, are similar to the resource server 32, except that the resource server 32 is local to the network 12, whereas the resource servers 67–68 must be accessed through the Internet 52. Although FIG. 1 shows several ISPs 51 and 56–58 for completeness and clarity, it will be recognized that any or all of these ISPs could be omitted from the system.

In this regard, if computer 16 was executing a standard Internet browser program, and if the user entered a domain name, the computer 16 would communicate according to an Internet-compatible protocol such as HTTP, through the network 12, gateway and firewall 46, communication link 47, ISP 51, Internet 52, ISP 56, and gateway and firewall 61 with the DNS server 66, in order to obtain the IP address corresponding to the domain name. Assuming for the sake of example that this IP address corresponds to the resource server 68, the computer 16 could then communicate, using a protocol such as HTTP, with the resource server 68 in order to download a segment or "page" of information which could then be visually displayed for the operator of computer 16.

The telephones 21–26 in FIG. 1 are, of course, capable of implementing a telephony function. Thus, for example, the telephone 21 can be used to place a call to one of the telephones 22–26, or to a telephone in the PSTN 37, such as the telephone 38. Similarly, a call can be made from the telephone 38 to one of the telephones 21–26. The signaling and control involved in initiating or terminating any given call are handled through communications with the call manager server 31 by one or more of the telephones 21–26 and/or the gateway 36. Once a call is established, segments of digital information representing audio sound are transmitted directly between one of the telephones 21–26 and either the gateway 36 or at least one other telephone 21–26, in a known manner. With respect to the initiation and termination of telephone calls, the basic operation of the call manager server 31 is known, and therefore not illustrated and described here in detail.

Each of the computers 16–19 can act as an independent client on the global network which includes the network 12 and the Internet 52, with respect to one or more servers such as those shown at 32 and 67–68, through use of a public network communication protocol such as the above-mentioned protocol known as HTTP. One feature of the invention, discussed in more detail later, is that each of the telephones 21–26 is also capable of using a public network communication protocol in order to act as an independent network client which communicates directly through a local or global network with a server, such as one of the servers 32 and 67–68. Communications of this type are carried out without any interaction with the call manager server 31. Moreover, they are carried out through the same packet-switched network 12 on which the telephones 21–26 also implement telephony functions.

Figure 2:
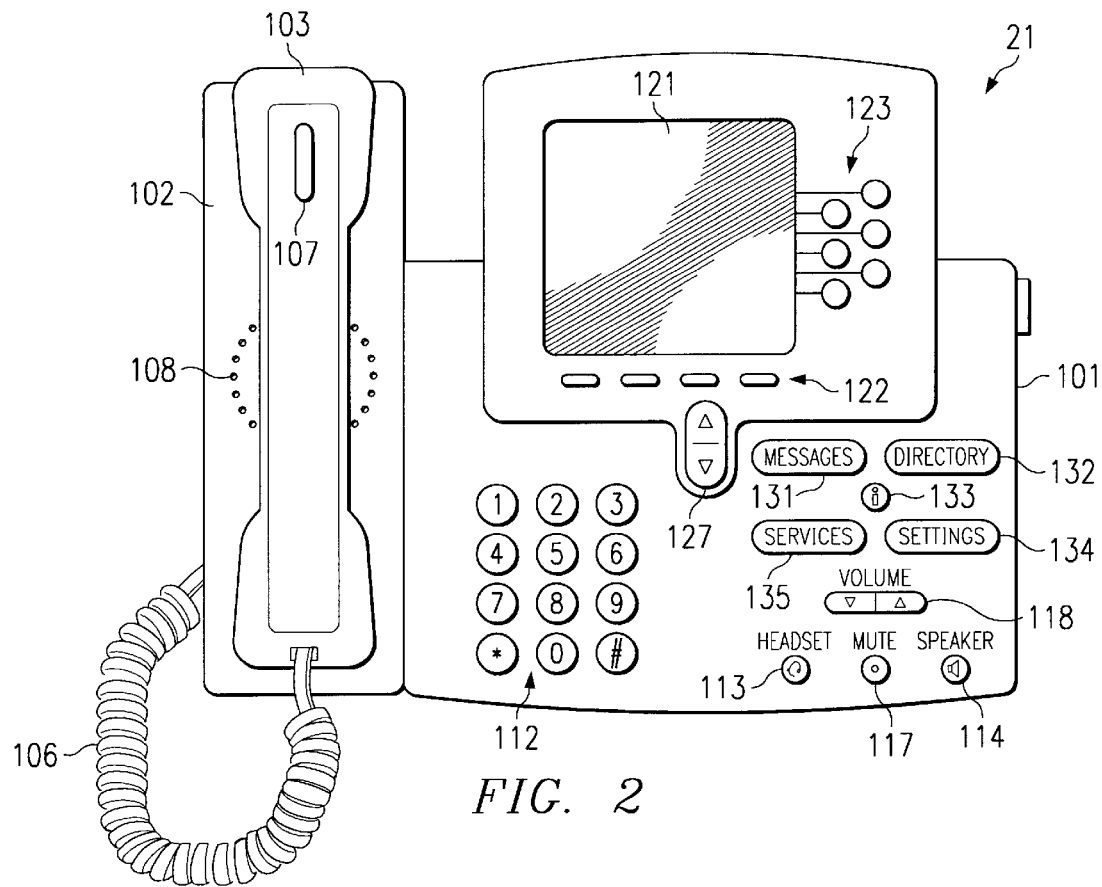
FIG. 2 is a diagrammatic view of telephone which is a component of the system of FIG. 1.

As mentioned above, the telephones 21–26 in the disclosed embodiment are all structurally identical. Therefore, only the telephone 21 will be described in detail. More specifically, FIG. 2 is an enlarged view of the telephone 21 of FIG. 1. The telephone 21 includes a housing 101, a portion 102 of which serves as a cradle. The cradle portion 102 has a plurality of openings 108, for a speakerphone which is disposed within the housing 101. A handset 103 removably rests on the cradle portion 102, and is electrically coupled to the circuitry within the housing 101 by a coiled cord 106. The handset 103 includes an indicator 107, which in the disclosed embodiment includes a light emitting diode (LED). The indicator 107 may, for example, be flashed when the telephone 21 is ringing, in order to indicate that there is an incoming call.

The telephone 21 further includes a dial pad 112, which is an industry-standard array of 12 keys. The keys 112 can be used to effect tone dialing through generation of standard dual tone multiple frequency (DTMF) sounds, and can also be used to enter text and/or numeric information. The telephone 21 has a not-illustrated headset jack of a standard type, to which a standard headset can be coupled. The telephone 21 has a headset key 113, which toggles on and off the speaking and listening paths for the headset. The telephone 121 also has a speaker key 114, which toggles on and off the speaking and listening paths for the speakerphone associated with openings 108.

A mute key 117 toggles on and off all speaking paths of the telephone 21 in order to mute all possible sources of incoming sound, including the microphone in the handset 103, the microphone in the headset, and sound entering the telephone through the speakerphone. It should be noted that the mute key 117 operates differently from the mute key commonly provided on the remote control unit for a television or a stereo system, because the mute key on such a remote control is used to mute sound which is being emitted by the television or stereo, whereas the mute key 117 in FIG. 2 is used to mute sound which is entering the telephone 21.

The telephone 21 includes a volume adjustment key 118. In the disclosed embodiment, the key 118 is a single rocker key that can be pressed at either end in order to implement one of two different functions. Alternatively, however, the key 118 could be implemented as two separate keys rather than a rocker key. The volume adjustment key 118 is used to increase or decrease the amplitude of sound waves being output onto the listening paths of the telephone, or in other words sound waves being sent to the speaker in the handset 103, the speaker in the headset, or the speakerphone.

The telephone 21 includes a display 121, which in the disclosed embodiment is a liquid crystal display (LCD). In particular, the display 121 is an array of 100 by 145 pixel elements, with gray scale capability. However, it will be recognized that other types of displays could be used, including but not limited to a color display, or a display with a larger or smaller number of pixels. A small distance below the bottom of the display 121 are four soft keys 122. At any given point in time, the function of each soft key 122 is specified by a label which appears immediately above it in the bottom portion of the display 121, as described in more detail later. A small distance to the right of the display 121 are six line keys 123, the functions which are also defined in a dynamic manner on the basis of labels which appear in alignment with them along the right side of display 121, as discussed later.

A scroll key 127 is disposed below the soft keys 122. In the disclosed embodiment, the scroll key 127 is a rocker key having two ends which can be selectively pressed to implement either of two different functions. Alternatively, the scroll key 127 could be in the form of two separate keys, rather than a rocker key. The scroll key 127 is used to scroll upwardly or downwardly through multiple entries presented on the display 121, as discussed later. The telephone 121 also includes a messages key 131, a directory key 132, an information key 133, a settings key 134, and a services key 135. Each of the keys 131–135 can be pressed in order to cause some information to be presented on the display 121, as discussed later.

Figure 3:
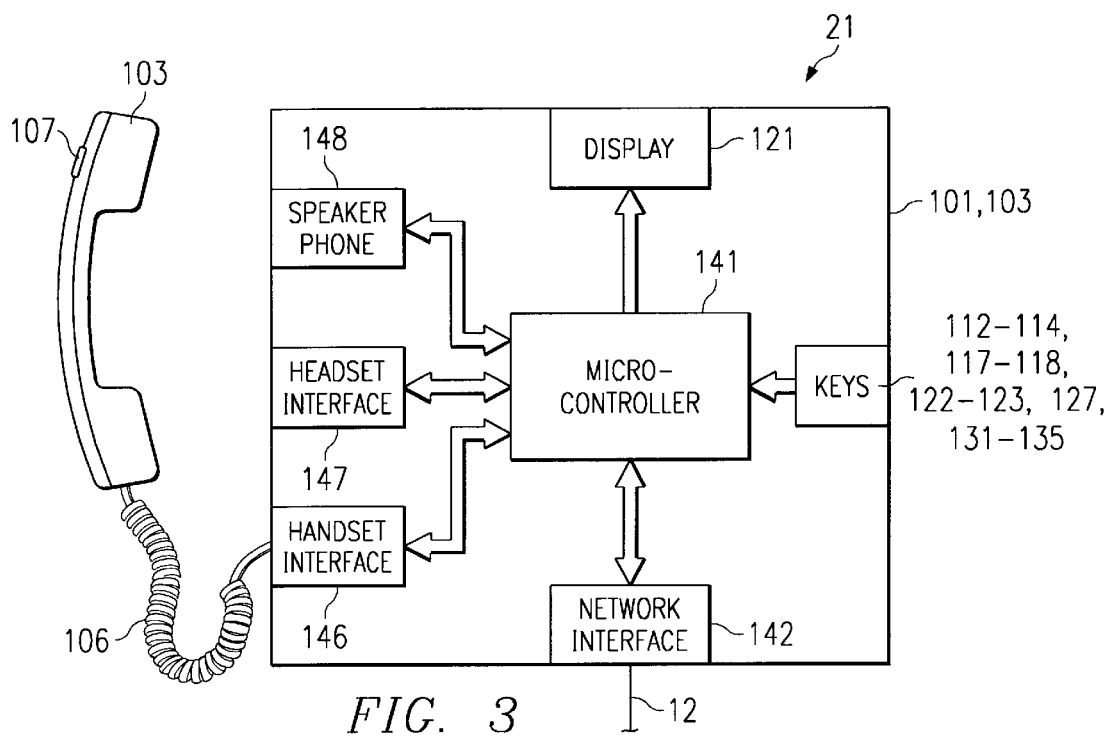
FIG. 3 is a block diagram of circuitry within the telephone of FIG. 2.

FIG. 3 is a diagrammatic view of the telephone 21, including its internal circuitry. As shown in FIG. 3, the telephone 21 includes a microcontroller 141, which is a commercially available device that includes a microprocessor, a random access memory (RAM), and a read only memory (ROM). The RAM and ROM are forms of computer readable storage mediums. The microcontroller 141 is operatively coupled to the display 121, and to each of the keys 112–114, 117–118, 122–123, 127 and 131–135. The telephone 21 also includes a network interface circuit 142, which interfaces the microcontroller 141 to the Ethernet network 12. The telephone 21 includes a handset interface 146, which converts digital information from the microcontroller 141 into audible sound that is supplied to the handset 103, and which converts audible sound from the handset 103 into digital information that is supplied to the microcontroller 141. The handset interface 146 also contains the circuitry to effect control of the indicator 107.

A headset interface 147 is also provided within the telephone 21, in order to interface the microcontroller 141 to the optional and not-illustrated headset which was mentioned above. The telephone 21 further includes a speakerphone 148 of a known type, which was mentioned above and which communicates with the microcontroller 141.

Figure 4:
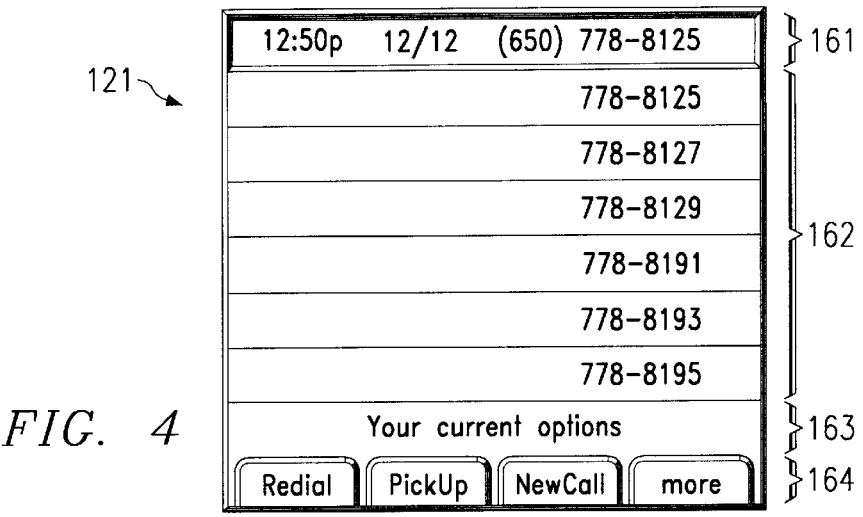
FIGS. 4–14 are each a diagrammatic view of a respective different image that can be displayed on a display which is a component of the telephone of FIG. 2.

FIG. 4 is a diagrammatic view of the display 121, showing the information which is displayed in an idle state of the telephone, when the telephone 21 is ready for an operator to make a call. Extending along the top of the display is a header line 161. In the disclosed embodiment, the header line 161 is present during all operational modes of the telephone. However, it will be recognized that a different header line, or no header line at all, could be used for some or all modes. In the disclosed embodiment, the header line 161 has the time of day at the left, followed by the current date (month and day), and then the primary telephone number associated with the particular telephone 21. At the right side of the header line 161, there is room to display an icon. In the disclosed embodiment an icon is presented when the telephone 21 is forwarding calls. Otherwise, no icon appears at the right side of the header line. However, it will be recognized that, in a variation of the disclosed embodiment, the use of icons at this location of the header line could be expanded so that a respective unique icon is displayed for each of several different operational states of the telephone 21.

Immediately below the header line 161 is a content area 162, which can be used to show a wide range of different types of information, depending on factors such as the current operational state of the telephone. In the idle state shown in FIG. 4, six telephone numbers are displayed along the right side of the content area 162, each such number being aligned with a respective one of the line keys 123 (FIG. 2). If, for example, a user wanted to initiate a telephone call on the telephone line corresponding to the uppermost of the six numbers, the user would press the uppermost line key 123, as discussed later.

Below the content layer 162 is a status/prompting line 163. In the disclosed embodiment, this line is always present, and is used to advise the user as to what the telephone is currently doing, or to provide a user prompt which pertains to the soft keys 122 (FIG. 2). At the bottom of the display 121, below the status/prompting line 163, is a soft key label line 164. This line can display up to four labels, each of which is disposed immediately above a respective one of the soft keys 122. In the disclosed embodiment, the soft key label line 164 is always present, although the number and content of the labels will vary as the operating state of the telephone changes.

Figure 5:
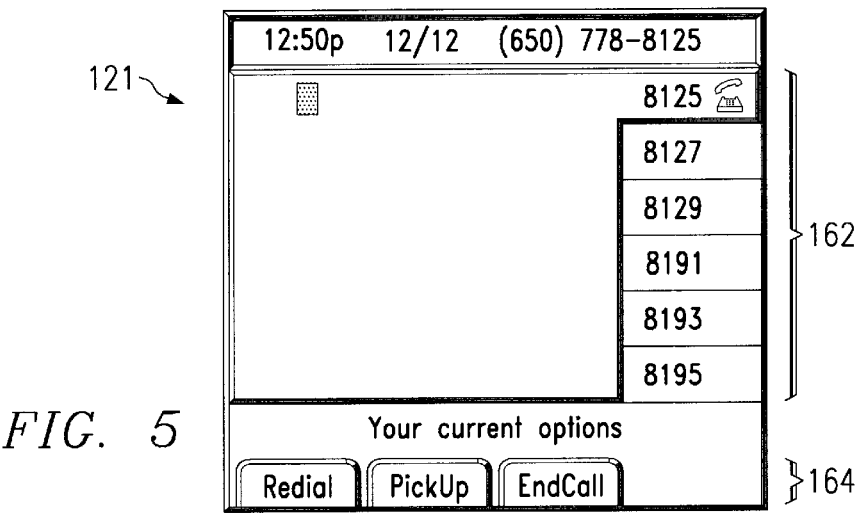

As mentioned above, if a user wishes to initiate a telephone call on the telephone line corresponding to the first of the six telephone numbers shown in FIG. 4 within the content area 162, the user presses the uppermost line key 123 in order to operatively couple the telephone to that telephone line and obtain a dial tone. In response to user operation of the uppermost line key 123, the telephone 21 will update the display 121 so that it appears as shown in FIG. 5. In FIG. 5, the telephone numbers have been shortened to four-digit extensions, an icon has been added to the right of the selected telephone number in order to indicate that the telephone now has off-hook status with respect to that telephone line, a line has been added to separate the other five telephone numbers from the remainder of the content area, and a cursor has been added in the content area 162.

Figure 6:
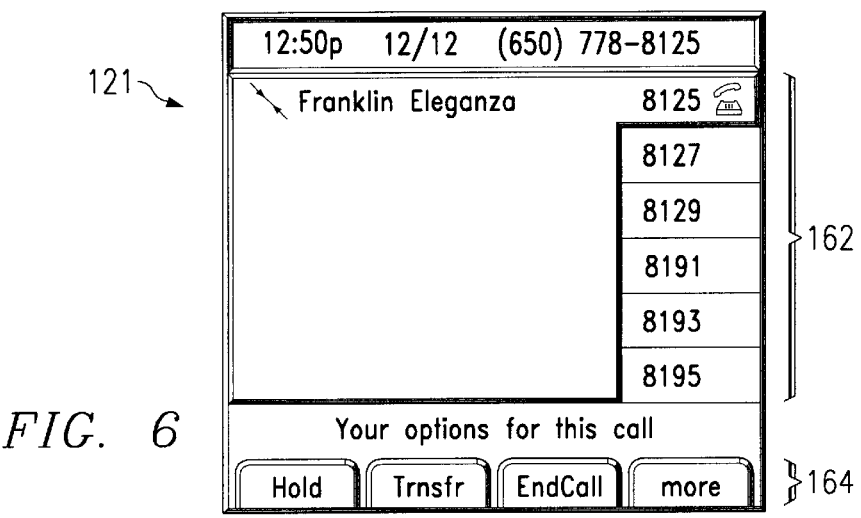

As the user dials the telephone number on the dial pad 112 (FIG. 2), the digits of the number will appear in the content area 162 at the cursor. There are other ways that the user could dial a number. For example, in FIG. 5, the leftmost label in the soft key label line 164 indicates that the leftmost soft key 122 is currently configured for a redial function. Accordingly, pressing the leftmost soft key 122 would cause the telephone to automatically redial the last number which it dialed. Thereafter, when the call is answered, and if caller identification information is available, the telephone 21 will display the name of the called party within the content area 162, for example as shown in FIG. 6.

There are various different ways in which a user can end a telephone call. For example, the user can replace the handset 103 back on the cradle portion 102 of the housing. Alternatively, the user could press the soft key 122 disposed below the "End Call" label (FIG. 6).

The telephone 21 is capable of implementing a variety of telephony functions which are not all described in detail here, because a detailed understanding of all of these functions is not needed in order to realize an understanding of the subject matter of the present invention. For example, and as evident from the soft key label line 164 in FIG. 6, the user can place a telephone call on hold by pressing the soft key 122 disposed below the "Hold" label in FIG. 6. Alternatively, the user could initiate a transfer of the current call to another telephone by pressing the soft key 122 disposed below the label "Trnsfr" in FIG. 6.

In order to establish a call to or from the telephone 21, message units in the form of Ethernet packets are transmitted between the telephone 21 and the call manager server 31, and also between the call manager server 31 and either the gateway 36 or one of the other telephones 22–26. In the disclosed embodiment, these message units conform to the Ethernet standard in order to facilitate their transmission through the network 12, but the information within these message units conforms to a dedicated protocol. Once the call has been established, message units representing voice information are sent directly between the telephone 21 and either the gateway 36 or one of the other telephones 22–26. In order to end the same call, message units are sent between the telephone 21 and the call manager server 31, and also between the call manager server 31 and either the gateway 36 or one of the other telephones 22–26.

In the disclosed embodiment, the message units used to establish a call, end a call, or transmit audio information conform to the Ethernet standard for purposes of transmission through the network 12. In contrast, the data within the Ethernet packets conforms to a dedicated protocol of a type which is known in the network telephone industry. Alternatively, however, the information within the Ethernet packets could be presented in a format which conforms to a public network communication protocol, such as the HTTP protocol.

The call manager server thus has ultimate control with respect to establishing, maintaining and ending telephone calls. For example, a telephone must communicate with the call manager server 31 in order to establish a call to or from that telephone, and in order to end the call. Moreover, even though digital data representing audio information does not need to be routed through the call manager server 31, the direct exchange of information between two of the telephones 21–26, or between one of these telephones and the gateway 36, is set up under control of the call manager server 31. A feature of the present invention involves the provision of capability in each of the telephones 21–26 to act as an independent client on the network, completely independently of the call manager server 31. In this regard, the telephones 21–26 in the disclosed embodiment each maintain a Transmission Control Protocol/Internet Protocol (TCP/IP) stack, including User Datagram Protocol (UDP), and they each have the capability to transmit and receive information expressed in an existing mark-up language, such as hypertext mark-up language (HTML) or extensible mark-up language (XML). HTML and XML are both compatible with the industry standards used for the portion of the Internet which is commonly known as the World Wide Web (WWW). While the disclosed embodiment uses TCP/IP, UDP, XML and HTML, it will be recognized that other protocols and mark-up languages could alternatively be used. The telephone 21 may also have the capability to understand various other industry standard protocols, such as Simple Mail Transfer Protocol (SMTP), Post Office Protocol 3 (POP3), Lightweight Directory Access Protocol (LDAP), File Transfer Protocol (FTP), and the industry standard protocol known as H.323. As a result of this capability, the telephones 21–26 are each capable of using a public network communication protocol to transmit information to and/or from various servers, such as the resource server 32 which is local to the network 12, as well as other servers which can be accessed through the Internet 52, such as the servers 66–68.

As one specific example of such communication, and with reference to FIG. 2, assume that a user wishes to place a call, but does not remember the particular number which needs to be dialed. This user could press the directory key 132. In response, and with reference to FIG. 1, the telephone 21 will use a public network communication protocol conforming to WWW standards, such as HTTP with HTML or XML, in order to communicate with a server 32 which contains directory information in a format commonly known as a Web page. The Web page containing this information will be sent to the telephone 21 through the network 12, in a manner similar to that by which a Web page is currently sent to a computer browser program which has requested it. The Web page sent to the telephone 21 may be customized for the display 121, for example by using a resolution compatible with the number of pixels in the display 121, or by using a gray scale image rather than a color image.

Figure 7:
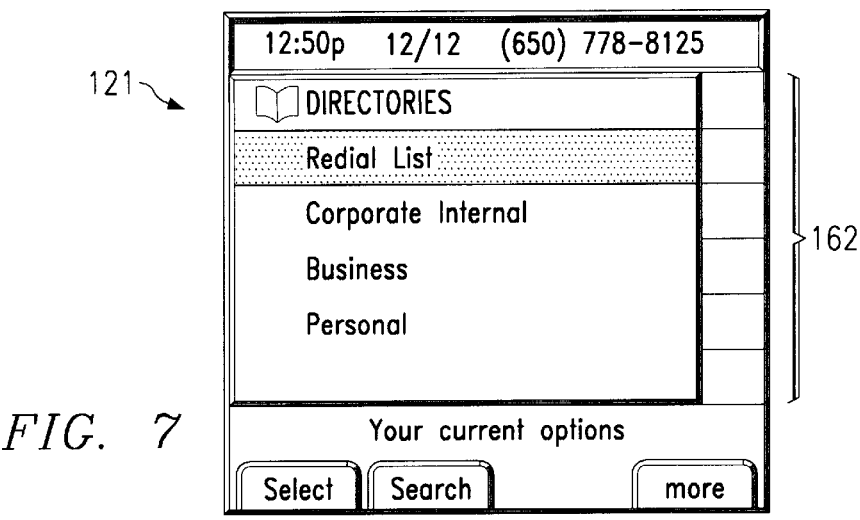

After receiving the Web page from the server 32, the telephone 21 will display information from the Web page in the content area 162 under the title "DIRECTORIES", as shown in FIG. 7, along with a list of one or more different directories. In the example of FIG. 7, four possible directories have been listed, including: (1) a directory of several recently dialed numbers, (2) a directory of telephone numbers internal to the corporation or other entity which owns the network 12 and the telephones 21–26, (3) a directory of business contacts, and (4) a directory of personal contacts. Each of these listed directories is effectively a hyperlink to a respective further Web page, which contains the specific information for the respective directory from the list. The user can select one of these four directories by scrolling a highlight bar up or down through the list using the scroll key 127, and by then pressing the soft key 122 below the "Select" label.

Figure 8:
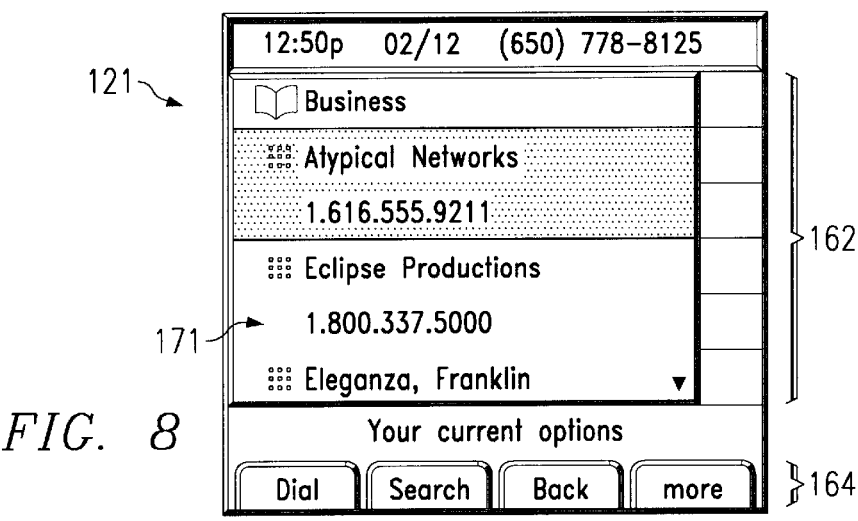

For the sake of example, assume that a user selects the business directory using this technique. The telephone 21 would then effect another communication across the network in order to retrieve the Web page corresponding to the business directory, and then display information from the received page in the content area 162, for example as shown in FIG. 8. In FIG. 8, the content area 162 displays the title "business", along with a list of the names and telephone numbers of several businesses. A scroll icon in the form of an arrowhead 171 is displayed, in order to indicate that the directory includes more entries than can be displayed at one time in the content area 162. The user can bring these additional entries into view by using the scroll key 127 to scroll within the list. In FIG. 8, the leftmost label in the soft key label line 164 is the label "Dial". If the user presses the soft key 122 below this label, the telephone 21 will automatically use the telephone number in the selected entry from the Web page in order to effect dialing in order to initiate a telephone call to the selected entity.

Figure 9:
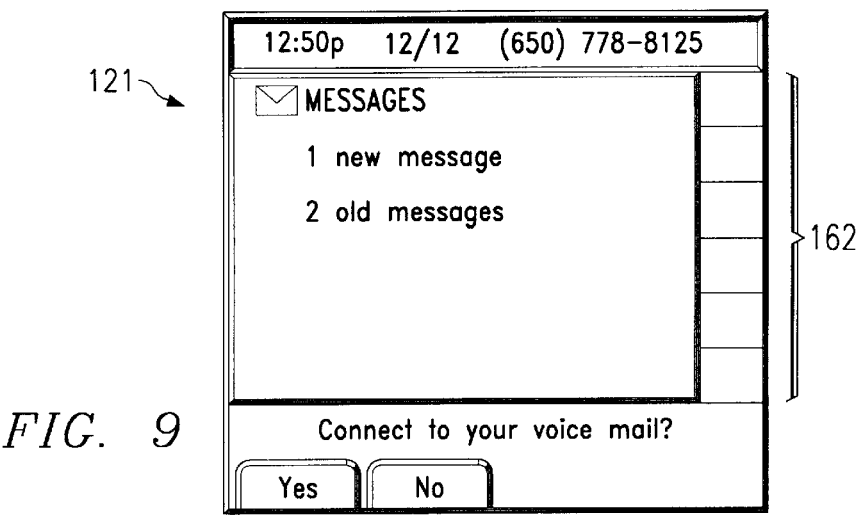

Assume that, instead of pressing the directory key 132, the user pressed the messages key 131. The telephone 21 would respond by using a public network communication protocol to request a Web page containing information relating to voice-mail messages associated with the telephone 21, for example from the resource server 32. Following receipt of this Web page, the telephone 21 would present information from the Web page on the display 121, in the manner shown in FIG. 9. In particular, the content area 162 has at the top a title "MESSAGES", below which is a list with two entries, one of which indicates that there is one new message and the other of which indicates there are two old messages. The user can then operate the scroll key 127 in order to select either the new message or the old messages, and then press the soft key 122 which is below the "YES" label appearing in the bottom left corner of the display.

Figure 10:
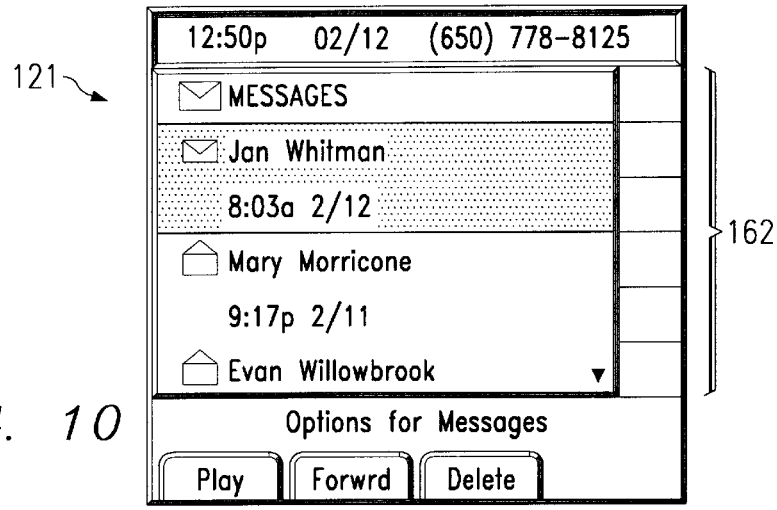

The telephone 21 will then request, receive and display at 121 a further Web page providing a list of specific messages within the selected category, for example as shown in FIG. 10. The user can then operate the scroll key 127 in order to select one of the messages in the list of FIG. 10, and then press the soft key 122 which is under the "Play" label in the lower left corner of the display. This will cause the telephone 21 to carry out further interaction with the server 32 using WWW-compatible protocols. The server 32 may send the audio information for the selected voice-mail message to the telephone 21 in any suitable WWW-compatible format for audio information, such as an H.323 voice stream, or as a packaged audio file. The telephone 21 will then take the information which is received from the server and which represents audio sound, and convert it into actual audible sound which is output through the currently-active listening path.

It will be noted that this technique for obtaining voice-mail messages is significantly different from that used by a pre-existing telephone, where DTMF sounds are used to control the access to voice-mail messages under control of the call manager server, and sound is transmitted across the network in a proprietary format of the same type used to transmit audio information of a telephone call. In contrast, the telephone 21 uses WWW-compatible protocols to act as an independent network client which retrieves a voice-mail message, where the audio information is in a WWW-compatible format rather than a proprietary format. Further the telephone carries this out without the participation or even the awareness of the call manager server 31.

Figure 11:
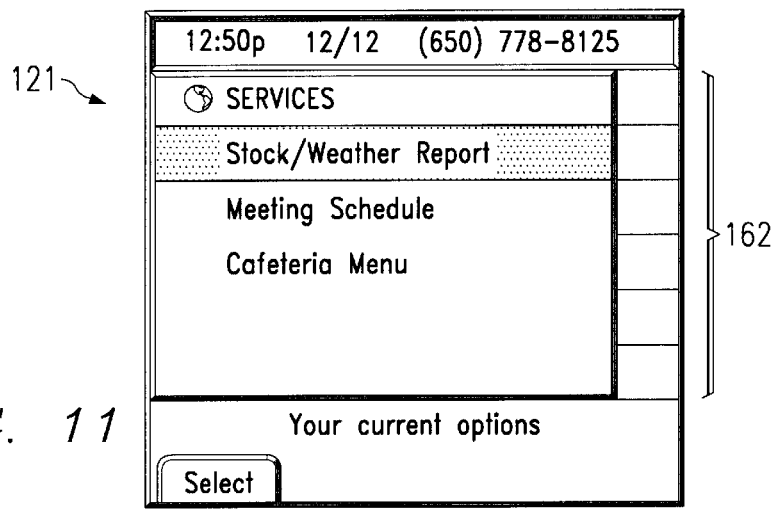

Assume that, instead of pressing the directory key 132 or the messages key 131, the user pressed the services key 135. In response, the telephone 21 would use WWW-compatible protocols to interact with the server 32 in a manner similar to that described above. The server 32 would send the telephone 21 a Web page containing a list of services, which would be presented on the display in the content area 162 of the display 121, for example as shown in FIG. 11. More specifically, and as shown in FIG. 11, the label "SERVICES" appears at the top of the content area 162, and below it there is a list of three services. The number and types of services listed in FIG. 11 are merely exemplary. The number of services could be larger or smaller than that shown in FIG. 11. Further, the list could include services different from those shown in FIG. 11.

In FIG. 11, the first listed service provides a display of a report containing current weather information and stock prices. The second listed service will provide a schedule of meetings for the person to whom the telephone 21 is assigned, and the third listed service will provide a current menu for a cafeteria at the facility where the telephone 21 happens to be located. The user can operate the scroll key 127 in order to select one of the three listed services, and can then press the soft key 122 below the "Select" label in the lower left corner of the display, in order to invoke the selected service. The telephone 21 will then request additional information from the server 32 regarding the selected item, and display the additional information in the content area 162 of the display 121. For example, if the user selected the "Stock/Weather Report" entry in FIG. 11, the telephone 21 will obtain from the server 32 and present on the display 121 a report containing weather information and stock price information, such as the report shown at 162 in FIG. 12.

Figure 12:
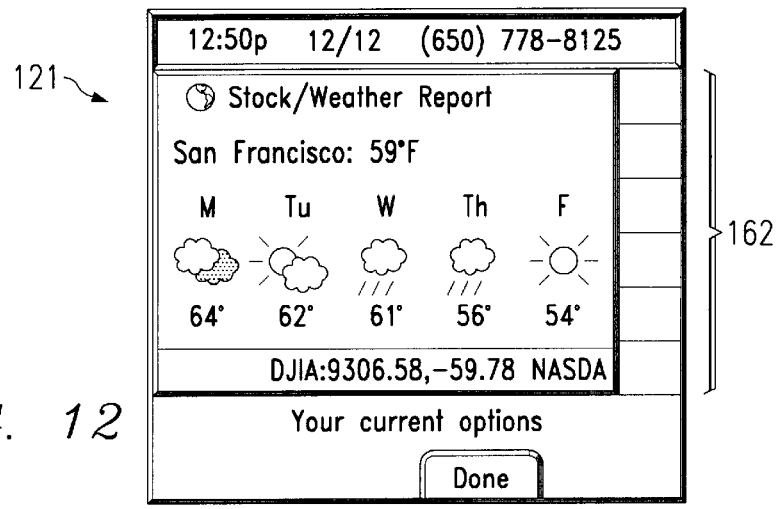
Figure 13:
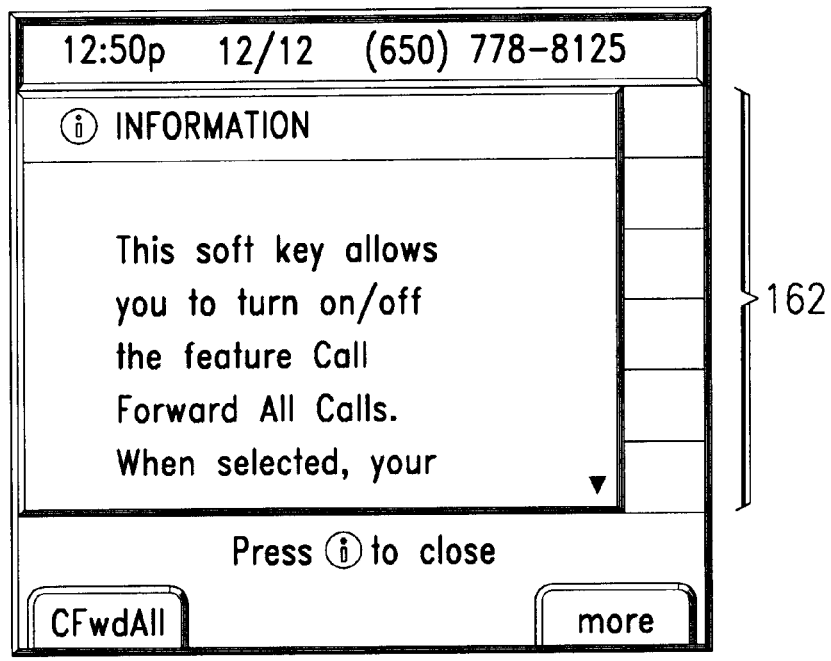

In the exemplary display shown in FIG. 12, a five-day weather forecast is displayed for the locality of the city of San Francisco. However, a given user may wish to see weather for some other place, which may be local or remote, or may wish to see a forecast which covers only one or two days but contains more detailed weather information. Similarly, the stock price information shown in FIG. 12 is information about some common industrial averages, but a given user may wish to monitor the prices of several specific stocks owned by that user. Further, the user may be interested in seeing current sports scores throughout the duration of a sporting event, and may wish to select which specific sporting event(s) will be monitored. Yet another possibility is that a user may wish to access short-form news headlines, which in turn may link to short-form news summaries. A variety of other possibilities exist.

Consequently, it will be recognized that a user may wish to have the ability to customize which specific services will appear in the list shown in FIG. 11, and/or may wish to customize the information or format used for any particular service. Customization of this type may be effected by the user through the use of special customization Web pages which permit the telephone 21 to interact directly with the resource server 32 in a manner providing the server with customization or configuration information specific to the particular user, within predefined limits. Alternatively, customization could be carried out directly at the resource server 32, for example using a keyboard and monitor coupled to the server 32, or could be carried out by accessing the server 32 through use of a conventional Web browser program running on a computer such as the computer 16.

The foregoing discussion has addressed what happens if a user presses one of the messages key 131, the directory key 132, or the services key 135. Still another key which a user might elect to press is the information or help key 133, which has on it the lower-case letter "i" to represent the word "information". If a user presses the information key 133, followed by a press of any one of the keys on the telephone 21, the telephone 21 makes a WWW-compatible request, for example to the server 32, for a Web page containing an explanation of the function of the key which was pressed after the information key 133. If the additional key is one of the soft keys 122 or the line keys 123, the information presented will correspond to the current function of that key as reflected by the label which was displayed adjacent to that key at the time the key was pressed. In other words, as to the soft keys 122 and line keys 123, the information provided is context sensitive information.

Figure 14:
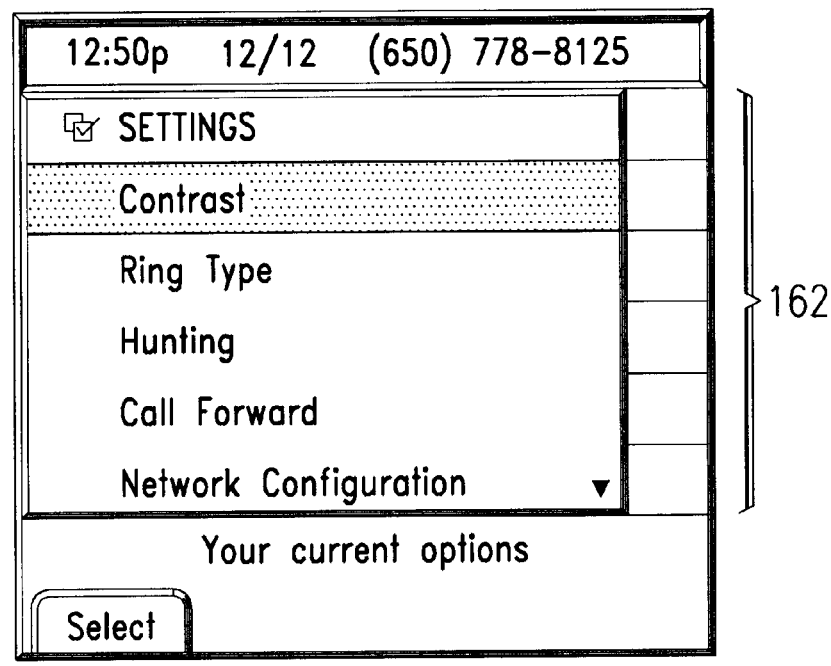

One further key which is available to the user is the settings key 134. If a user presses the settings key 134, the telephone 21 displays in the content area 162 a list of operational parameters or settings which can be configured by the user, as shown at 162 in FIG. 14. For example, and with reference to FIG. 14, the telephone 21 of the disclosed embodiment permits the user to selectively adjust the contrast of the display 121, change the type of audible ring emitted by the telephone in response to an incoming call, and so forth. In the disclosed embodiment, the list and the corresponding adjustments are implemented locally, and thus the telephone 21 can display the list and implement the associated adjustments without communicating across the network 12 with a server. However, it will be recognized that it would alternatively be possible for the settings menu to include options which cause the telephone 21 to act as an independent client which communicates with a server.

For the sake of simplicity and convenience, the foregoing discussion has indicated that, in response to operation of any one of the directory key 132, messages key 131, services key 135, or information key 133, the telephone 21 communicates specifically with the server 32. However, it will be recognized that some or all of these keys could cause the telephone 21 to communicate with respective different servers. For example, the directory key 132 and messages key 131 might cause the telephone 21 to communicate with the server 32, while the services key 135 might cause the telephone 21 to communicate through the Internet 52 with the server 67, and the information key 133 might cause the telephone 21 to communicate through the Internet 52 with the server 68.

The telephone 21 does not necessarily know whether it is communicating with a local server on the network 12, or a remote server through the Internet 52. In particular, since the telephone 21 is effecting communication according to a public network communication protocol, which in the disclosed embodiment is a WWW-compatible protocol, the telephone 21 simply transmits its request in appropriate packets which have proper Internet protocol (IP) addresses, much like any standard browser program, with the knowledge that the appropriate network or networks will properly route the packets to the correct destination, whether it is a local server or a remote server.

In the disclosed embodiment, the display 121 has substantially fewer pixels than the displays associated with most computers, and is a gray scale display rather than a color display. Accordingly, the telephones 21–26 in the disclosed embodiment do not have the capability to display all Web pages which are currently available on the Internet, some of which are large and high resolution color pages designed for display on the monitors of personal computers. The Web pages which have been discussed above are Web pages that are configured for a display of the size and resolution embodied in the display 121 of the telephones 21–26.

Also, there are additional Web pages which are already available on the Internet, and which are configured for displays comparable to the display 121 of the telephone 21. As one example, there are existing Web pages which are configured specifically for the LCD displays of the pre-existing devices commonly known as personal digital assistants (PDAs), and the telephones 21–26 are each capable of acting as an independent network client which can download and display such pages without interacting with the call manager server 31. Further, third party vendors can readily develop public Web pages which are compatible with the characteristics of the display 121 of the telephone 21.

One of the entries in the services menu of FIG. 11 might be "Internet Sites" and, if selected, might bring up a list of Internet sites that are of interest to the particular user, where each entry in the list is associated with a domain name for the particular site. Then, if the user used the scroll key 127 and the soft key 122 to select one of these sites, the telephone 21 would use WWW-compatible techniques to access the DNS server 66 in order to resolve the domain name into an IP address, and then use the IP address to access, download and display the Web page of interest.

Figure 15:
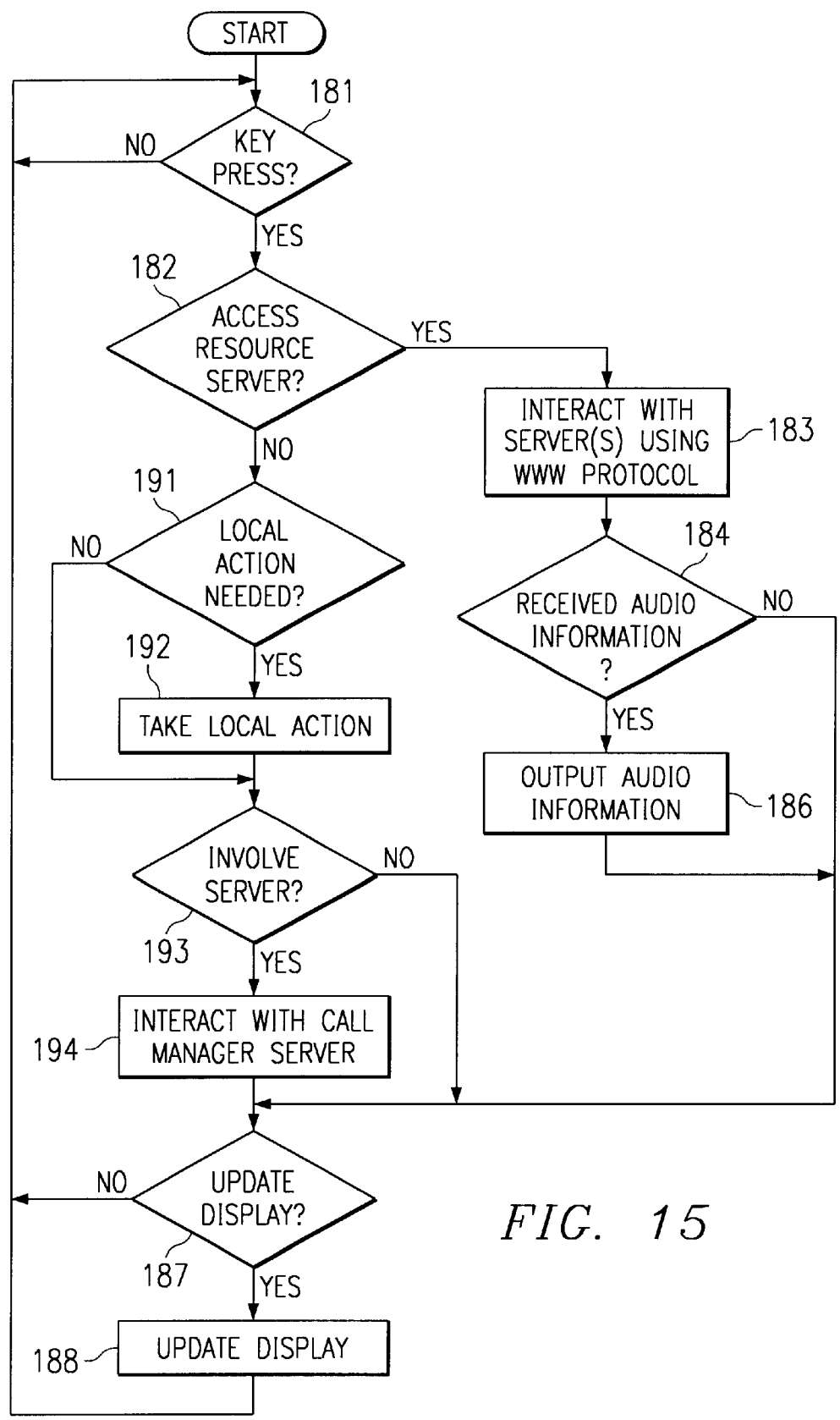
FIG. 15 is a high-level flowchart depicting the action taken by the telephone of FIG. 2 in response to the manual actuation of any of several keys provided on the telephone.

FIG. 15 is a flowchart which provides a very high-level view of actions that occur within the telephone 21 in response to the operation of various keys. In particular, at block 181, the telephone checks to see if any key on the telephone has been pressed. If not, the telephone waits for a key to be pressed. Otherwise, control proceeds to block 182, where the telephone makes a determination of the general approach which it should take with respect to the particular key that has been pressed. Broadly speaking, this is a determination of whether the telephone will be communicating with the call manager server 31 in association with initiating, maintaining or ending a telephone call, or whether it will be acting as an independent network client which communicates directly with a network server according to WWW-compatible protocols.

If the telephone 21 determines that it is to act as an independent network client, then control proceeds to block 183, where the telephone interacts with one or more network servers using WWW-compatible protocols. Then, at block 184, the telephone checks to see whether the information received includes information which represents audio sound. If not, then the telephone skips block 186. Otherwise, the telephone proceeds to block 186, where it uses the information to generate audible sound, which it then outputs through the current listening path. Then, control proceeds to block 187, where the telephone makes a determination of whether it needs to update the display. If not, control returns to block 181. Typically, however, some form of update will be required for the display, and control will proceed to block 188, where the display is updated. Then, control returns to block 181.

If it had been determined at block 182 that the operated key did not require the telephone to act as a network client, then control would have proceeded to block 191, where the telephone makes a determination of whether some immediate local action is needed in response to the key press. More specifically, even where a key press requires communication with the call manager 31, it may be necessary for the telephone to first take some local action which is immediately perceptible to the user, so that the user does not experience a somewhat uncomfortable delay between the operation of the key and implementation of the action. For example, when the user is ending a call by pressing a key rather than hanging up the handset, the user expects to hear an almost immediate dial tone, without intervening delay. Moreover, there are some key presses which involve only local action, without any interaction with the call manager server 31. One example is adjustment of the audio volume using the volume key 118.

In any case where prompt local action is appropriate, control proceeds from block 191 to block 192, where the telephone takes the appropriate local action. On the other hand, if immediate local action is not needed, block 192 is skipped. In either case, control ultimately arrives at block 193, where the telephone determines whether it needs to communicate with the call manager server 31. If not, then block 194 is skipped. Otherwise, in block 194, the telephone interacts in an appropriate manner with the call manager server 31. In either case, control ultimately proceeds to block 187, which has already been described.

Although the disclosed embodiment has a number of keys which can be manually pressed in order to invoke various functions, it will be recognized that the telephone 21 could be provided with the capability to invoke many of these same functions through the use of voice commands. As one example, the telephone 21 could be responsive to voice commands of a user to scroll up or down within a list presented on the display 121, thereby avoiding the need for the user to manually press the scroll key 127 in order to effect scrolling.

The present invention provides a number of technical advantages. One such technical advantage is the provision in an IP telephone of the capability to act as an independent network client that uses public network communication protocols. In this manner, the telephone can communicate directly with a server, without the intervention or even awareness of the call manager unit associated with the telephone.

A related advantage is that the telephone is not limited to a set of features provided by a control processor such as a call manager server. Instead, the telephone is able to act as a client with respect to a variety of resource servers, including but not limited to LDAP-based directory systems, Web-based voice-mail systems, Web-based stock monitoring services, and H.323 client video switching servers. Yet another related advantage is that various services and features can be easily added to the telephone, without making any change or upgrade to the software in a call manager server, and in fact without the awareness of the call manager server. Third parties can easily create such new services or features for the telephone, by simply conforming to existing industry standards for Web page development, without any significant amount of knowledge about the internal operation of the telephones. As network resource servers add these capabilities and/or features, the telephone will be able to access them without any help from or changes to the call manager server.

Still another related advantage is that, to the extent that new features or services are implemented in network servers and can be accessed by a telephone using existing industry standard protocols, the new features and services can be implemented using industry standard development tools. This not only speeds development, but also simplifies training. Another relates advantage is that any added feature or service which can be accessed using existing industry standard protocols permits the feature or service to be accessed on a global basis, independently of any proprietary protocol which may be associated with the telephony functions of any particular IP telephone system.

Although one embodiment has been illustrated and described in detail, it will be understood that various substitutions and alterations can be made therein without departing from the spirit and scope of the present invention, as defined by the following claims.

What is claimed is:

1. An apparatus comprising a telephone unit which includes:
   a network interface adapted to couple said telephone unit to a network, said network interface being operable to transmit and receive information through said network;
   a user interface;
   a control portion coupled to said network interface and to said user interface, said control portion being selectively operable to cause said telephone unit to facilitate a telephony function by transmitting and receiving through said network interface message units of a first digital format, being selectively operable to cause said telephone unit to function as an independent network client capable of communicating directly with a server by transmitting and receiving through said network interface message units of a second digital format and which conform to a public network communication protocol;
   wherein said telephone unit includes a display which is coupled to said control portion;
   wherein said control portion is operable to present on said display information received by said telephone unit in message units of said second digital format; and
   wherein said information received in said message units of said second digital format includes information which identifies whether there are pending voice-mail messages, and which is presented on said display by said control portion.

2. An apparatus according to claim 1, wherein said information received in said message units of said second digital format includes digital information representative of the audio content of a voice-mail message, and wherein said control portion is operable in response to the received digital information representing audio content for causing said user interface to produce audible sound corresponding to the audio content.

3. An apparatus according to claim 1, wherein said information received in said message units of said second digital format includes information which explains a selected function of said telephone unit, and which is presented on said display by said control portion.

4. An apparatus according to claim 1, wherein said information from said message units of said second digital format includes information which is selected according to a selection function pre-specified for said telephone unit by a user, and which is presented on said display by said control portion.

5. An apparatus according to claim 4, wherein said information from said message units of said second digital format, which is presented on said display, includes one of selected weather information, and selected financial information.

* * * * *